United States Patent
Horikoshi

(10) Patent No.: US 10,737,640 B2
(45) Date of Patent: Aug. 11, 2020

(54) VEHICLE ENGINE BAFFLE PLATE FOR REDUCING NOISE

(71) Applicant: TOYOTA JIDOSHA KABUSHIKI KAISHA, Toyota-shi, Aichi-ken (JP)

(72) Inventor: Osamu Horikoshi, Gotenba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/266,338

(22) Filed: Feb. 4, 2019

(65) Prior Publication Data

US 2019/0308568 A1 Oct. 10, 2019

(30) Foreign Application Priority Data

Apr. 4, 2018 (JP) ................................ 2018-072718

(51) Int. Cl.
*B60R 13/08* (2006.01)
*B62D 35/02* (2006.01)
*F02B 77/13* (2006.01)

(52) U.S. Cl.
CPC ...... *B60R 13/0838* (2013.01); *B60R 13/0861* (2013.01); *B60R 13/0884* (2013.01); *B62D 35/02* (2013.01); *F02B 77/13* (2013.01); *B60Y 2306/09* (2013.01)

(58) Field of Classification Search
CPC .. B60R 13/0838; B60R 13/08; B60R 13/0815
See application file for complete search history.

(56) References Cited

U.S. PATENT DOCUMENTS

| 4,071,009 A | | 1/1978 | Kraina | |
| 4,455,971 A | * | 6/1984 | Kirchweger | ........ B60R 13/0838 123/198 E |
| 4,562,895 A | * | 1/1986 | Kirchweger | ........... B60K 11/08 123/198 E |
| 5,269,264 A | * | 12/1993 | Weinhold | ............. B60K 11/085 123/198 E |
| 5,626,185 A | * | 5/1997 | Gielda | ................... B60K 11/02 165/41 |

(Continued)

FOREIGN PATENT DOCUMENTS

| JP | S58-177781 A | 10/1983 |
| JP | 2000-073781 A | 3/2000 |
| JP | 2001-010544 A | 1/2001 |

*Primary Examiner* — John D Walters
*Assistant Examiner* — James J Triggs
(74) *Attorney, Agent, or Firm* — Oliff PLC

(57) ABSTRACT

A vehicle lower structure includes an internal combustion engine arranged in an engine compartment of a vehicle; a lower cover arranged below the internal combustion engine and formed so as to cover a lower portion of the engine compartment; and one or more baffle plates arranged between the internal combustion engine and the lower cover. The one or more baffle plates are located within a range of the width of the internal combustion engine in the engine compartment with respect to the front-rear direction of the vehicle. The one or more baffle plate protrude toward the lower cover from the side of the internal combustion engine or toward the internal combustion engine from the side of the lower cover with respect to the top-bottom direction of the vehicle. The one or more baffle plate are formed so as to extend to the left-right direction of the vehicle.

10 Claims, 6 Drawing Sheets

First Embodiment

(56) References Cited

U.S. PATENT DOCUMENTS

| | | | | |
|---|---|---|---|---|
| 6,550,440 B1* | 4/2003 | Vrsek | ............ | F01M 11/0004 |
| | | | | 123/184.61 |
| 6,854,544 B2* | 2/2005 | Vide | ............ | B60K 11/085 |
| | | | | 180/68.1 |
| 7,055,638 B2* | 6/2006 | Khalighi | ............ | B62D 35/005 |
| | | | | 180/116 |
| 8,544,583 B2* | 10/2013 | Ajisaka | ............ | B60K 11/08 |
| | | | | 180/68.1 |
| 9,188,052 B2* | 11/2015 | Tajima | ............ | B60K 11/04 |
| 9,440,555 B2* | 9/2016 | Garfinkel | ............ | B60L 11/1874 |
| 9,770,973 B1* | 9/2017 | Vaddiraju | ............ | B60K 11/08 |
| 10,279,677 B2* | 5/2019 | Nitsche | ............ | B60K 11/08 |
| 2011/0221223 A1* | 9/2011 | Mizata | ............ | B60R 13/083 |
| | | | | 296/39.3 |

* cited by examiner

First Embodiment

Comparative Example

VEHICLE ENGINE BAFFLE PLATE FOR REDUCING NOISE

CROSS-REFERENCE TO RELATED APPLICATION

This application is based on and claims the benefit of Japanese Patent Application No. 2018-072718, filed on Apr. 4, 2018, which is incorporated by reference herein in its entirety.

BACKGROUND

Technical Field

The present disclosure relates to a vehicle lower structure, and more particularly to a vehicle lower structure that includes an internal combustion engine and a lower cover that is arranged below the internal combustion engine.

Background Art

For example, JP 2001-010544 A discloses a lower cover for an internal combustion engine. This lower cover is attached to a vehicle body at the lower side of the internal combustion engine. In order to reduce noise produced from the internal combustion engine, small protrusions for producing a diffused reflection of the noise are formed on the surface of the lower cover.

SUMMARY

During running of a vehicle, a relative wind produced when the vehicle moves flows into an engine compartment in which an internal combustion engine is mounted. A part of the relative wind that has flown thereinto flows a space between the internal combustion engine and a lower cover, and is then discharged outside the vehicle from the interior of the engine compartment through a gap between the lower cover and the vehicle body. The kind of flow of the relative wind affects the propagation of engine radiated sound (sound wave) that is radiated from the internal combustion engine. In detail, due to the effect of the relative wind described above, the engine radiated sound from a lower portion of the internal combustion engine and its vicinity (i.e., portion on the vehicle front side) becomes easy to pass through a gap between the internal combustion engine and the lower cover to propagate toward the vehicle rear side.

In view of the point described above, it would be favorable that, in order to decrease the engine radiated sound that is radiated outside the vehicle from the interior of the engine compartment, the propagation, toward the rear side, of the vehicle of the engine radiated sound passing through the gap between the internal combustion engine and the lower cover is reduced.

However, the technique disclosed in JP 2001-010544 A does not reduce the propagation itself, toward the vehicle rear side, of the engine radiated sound passing through the gap described above. In this respect, the technique disclosed in JP 2001-010544 A still has room for improvement to reduce the discharge of the engine radiated sound toward the outside of the vehicle from the engine compartment.

The present disclosure has been made to address the problem described above, and an object of the present disclosure is to provide a vehicle lower structure that can favorably reduce the propagation, toward the vehicle rear side, of engine radiated sound passing through a gap between an internal combustion engine and a lower cover.

A vehicle lower structure according to the present disclosure includes: an internal combustion engine arranged in an engine compartment of a vehicle; a lower cover arranged below the internal combustion engine and formed so as to cover a lower portion of the engine compartment; and one or more baffle plates arranged between the internal combustion engine and the lower cover. The one or more baffle plates are configured to: be located within a range of a width of the internal combustion engine in the engine compartment with respect to a front-rear direction of the vehicle; protrude toward the lower cover from a side of the internal combustion engine or toward the internal combustion engine from a side of the lower cover with respect to a top-bottom direction of the vehicle; and extend to a left-right direction of the vehicle.

An acoustic absorbent may be arranged at a portion of at least one of the one or more baffle plates, the portion being located on at least a vehicle front side.

At least one of the one or more baffle plates may be configured by an acoustic absorbent.

The one or more baffle plates may include a plurality of baffle plates. Also, the plurality of baffle plates may be arranged so as to be separated from each other in the front-rear direction of the vehicle.

A first baffle plate which is at least one of the plurality of baffle plates may protrude toward the lower cover from the side of the internal combustion engine in the top-bottom direction of the vehicle. Also, a second baffle plate which is at least another one of the plurality of baffle plates may protrude toward the internal combustion engine from the side of the lower cover in the top-bottom direction of the vehicle. Furthermore, in a view of the plurality of baffle plates from a front side of the vehicle, the first baffle plate and the second baffle plate may be overlapped with each other in the top-bottom direction of the vehicle.

The first baffle plate and the second baffle plate may be arranged alternately in the front-rear direction of the vehicle.

The internal combustion engine may include an oil pan arranged at a bottom portion of the internal combustion engine. Also, at least one of the one or more baffle plates may be arranged on the oil pan or arranged on the lower cover at a location opposed to the oil pan.

At least one of the one or more baffle plates may be arranged on the oil pan or the lower cover at a portion located on a rear side of a center position of the oil pan in the front-rear direction of the vehicle.

At least one of the one or more baffle plates may be arranged on the oil pan so as to protrude toward the lower cover from a rear end portion of the oil pan in the front-rear direction of the vehicle.

At least one of the one or more baffle plates may be arranged on the lower cover so as to protrude from the lower cover toward a rear end portion of the oil pan in the front-rear direction of the vehicle.

According to the vehicle lower structure of the present disclosure, one or more baffle plates are arranged between the internal combustion engine and the lower cover. The one or more baffle plates are configured to: be located within a range of the width of the internal combustion engine in the engine compartment with respect to the front-rear direction of the vehicle; protrude toward the lower cover from the side of the internal combustion engine or toward the internal combustion engine from the side of the lower cover with respect to the top-bottom direction of the vehicle; and extend to the left-right direction of the vehicle. With this kind of baffle plate being installed, engine radiated sound passing through a gap between the internal combustion engine and the lower cover and propagating to the vehicle rear side can be favorably reduced.

DETAILED DESCRIPTION

Figure 1:
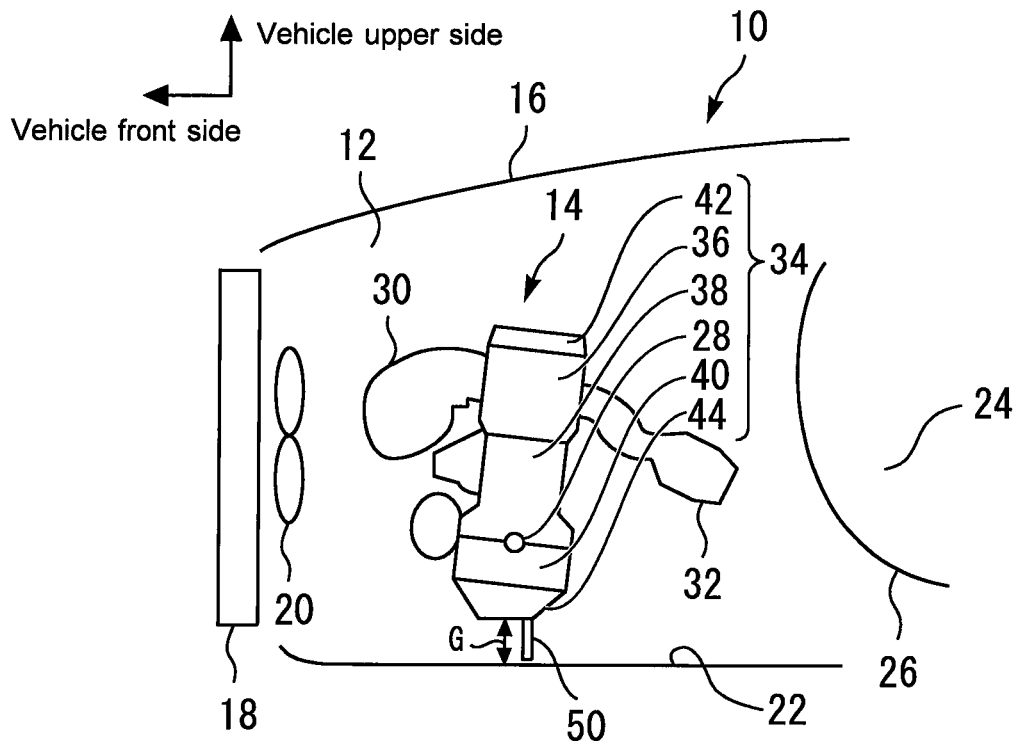
FIG. 1 is a diagram (a vehicle side view) that schematically illustrates a configuration around an engine compartment of a vehicle to which a vehicle lower structure according to a first embodiment of the present disclosure is applied.

In embodiments of the present disclosure which will be described later, elements that are the same as each other in the drawings are denoted by the same reference symbols, and redundant descriptions of those elements will be omitted or simplified. Moreover, it is to be understood that even when the number, quantity, amount, range or other numerical attribute of an element is mentioned in the following description of the embodiments, the present disclosure is not limited to the mentioned numerical attribute unless explicitly described otherwise, or unless the present disclosure is explicitly specified by the numerical attribute theoretically. Furthermore, structures or the like that are described in conjunction with the following embodiments are not necessarily essential to the present disclosure unless explicitly shown otherwise, or unless the present disclosure is explicitly specified by the structures or the like theoretically.

1. First Embodiment

Firstly, a first embodiment according to the present disclosure and a modification example thereof will be described with reference to FIGS. 1 to 4.

1-1. Vehicle Lower Structure 1-1-1. Configuration Around Engine Compartment

FIG. 1 is a diagram (a vehicle side view) that schematically illustrates a configuration around an engine compartment 12 of a vehicle 10 to which a vehicle lower structure according to the first embodiment of the present disclosure is applied. The vehicle 10 shown in FIG. 1 is provided with an internal combustion engine 14. The internal combustion engine 14 is arranged in the engine compartment 12 of the vehicle 10.

In FIG. 1, the left side of the sheet corresponds to the front side of the vehicle 10, and the upper side of the sheet corresponds to the upper side of the vehicle 10. An engine hood 16 is arranged at the vehicle upper side of the internal combustion engine 14. A radiator 18 and a cooling fan 20 are arranged at the vehicle front side of the internal combustion engine 14. In addition, a lower cover 22 is arranged at the vehicle lower side of the internal combustion engine 10. The lower cover 22 is installed so as to cover a lower portion of the engine compartment 12. Furthermore, a bulkhead 26 (such as, cowl top panel and dash panel) that separates the engine compartment 12 from a vehicle interior 24 is arranged at the vehicle rear side. It should be noted that vehicle components (not shown), such as a suspension tower, are arranged at both the vehicle-left-and-right sides of the internal combustion engine 14.

In the example shown in FIG. 1, the internal combustion engine 14 is mounted on the vehicle 10 such that the axial direction of a crankshaft 28 coincides with the left-right direction of the vehicle 10. Also, in the example shown in FIG. 1, the internal combustion engine 14 is mounted on the vehicle 10 such that intake-system parts 34 are located on the vehicle front side and exhaust-system parts 32 are located on the vehicle rear side.

The internal combustion engine 14 has an engine main body 34. The engine main body 34 includes, in addition to the crankshaft 28 described above, a cylinder head 36, a cylinder block 38, a crankcase 40, a cylinder head cover 42 and an oil pan 44. The cylinder head 36 is arranged on the cylinder block 38. The crankcase 40 is arranged below the cylinder block 38. The cylinder head cover 42 is attached to the cylinder head 36 so as to cover an upper portion of the cylinder head 36. The oil pan 44 is arranged below the crankcase 40, and an oil that lubricates individual portions of the internal combustion engine 14 is stored inside the oil pan 44. In the vehicle 10 shown in FIG. 1, the oil pan 44 corresponds to a bottom portion of the internal combustion engine 14.

1-1-2. Propagation Path of Engine Radiated Sound

Figure 2:
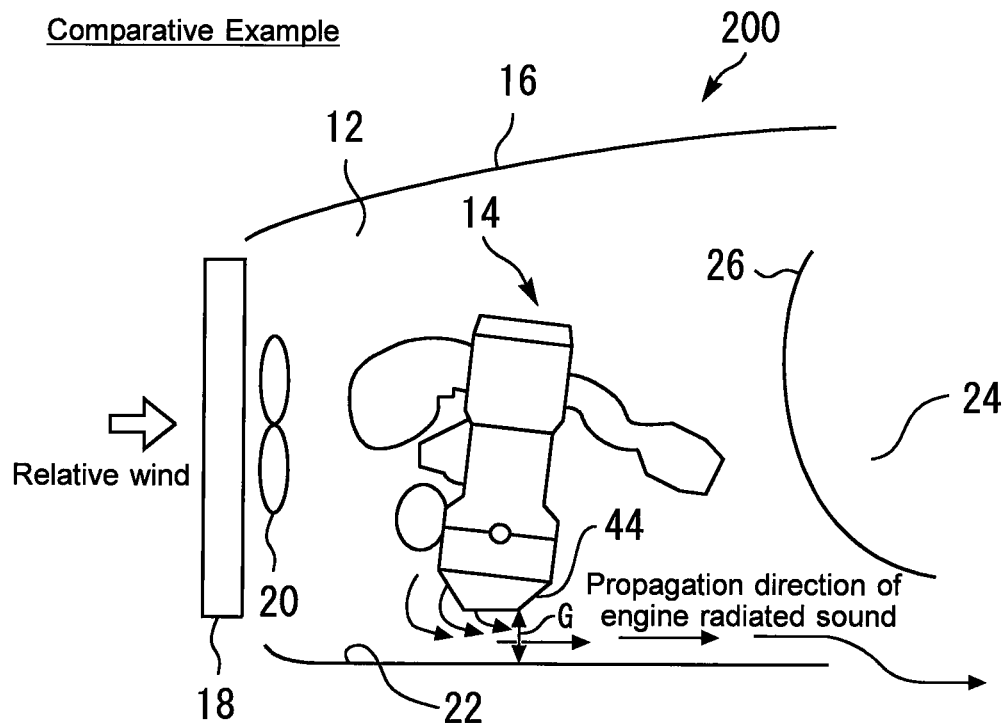
FIG. 2 is a schematic diagram for describing a propagation path of engine radiated sound in the engine compartment.

FIG. 2 is a schematic diagram for describing a propagation path of engine radiated sound in the engine compartment 12. In addition, it is supposed that a vehicle 200 in a comparative example shown in FIG. 2 is configured similarly to the vehicle 10 shown in FIG. 1 except that a baffle plate 50 described later is not included.

During running of the vehicle 200, a relative wind produced when the vehicle 200 moves flows into the engine compartment 12. A part of the relative wind that has flown thereinto flows through a space between the internal combustion engine 14 (more specifically, oil pan 44) and the lower cover 22, and is discharged outside the vehicle from the interior of the engine compartment 12 through a gap between the lower cover 22 and the vehicle body (bulkhead 26). This kind of flow of the relative wind affects the propagation of engine radiated sound (sound wave) that is radiated from the internal combustion engine 14. In detail, due to the effect of the relative wind described above, the engine radiated sound from a lower portion (in the example shown in FIG. 2, oil pan 44) of the internal combustion engine 14 and the vicinity thereof (in the example shown in FIG. 2, portion located on the vehicle front side in the vicinity of the oil pan 44) becomes easy to pass through a gap G between the oil pan 44 and the lower cover 22 to propagate toward the vehicle rear side.

In view of the point described above, it is required that, in order to decrease the engine radiated sound that is radiated outside the vehicle from the interior of the engine compartment 12, the propagation, toward the vehicle rear side, of the engine radiated sound passing through the gap G between the oil pan 44 and the lower cover 22 be reduced.

1-1-3. Example of Configuration of Main Part of Vehicle Lower Structure

Figure 3:
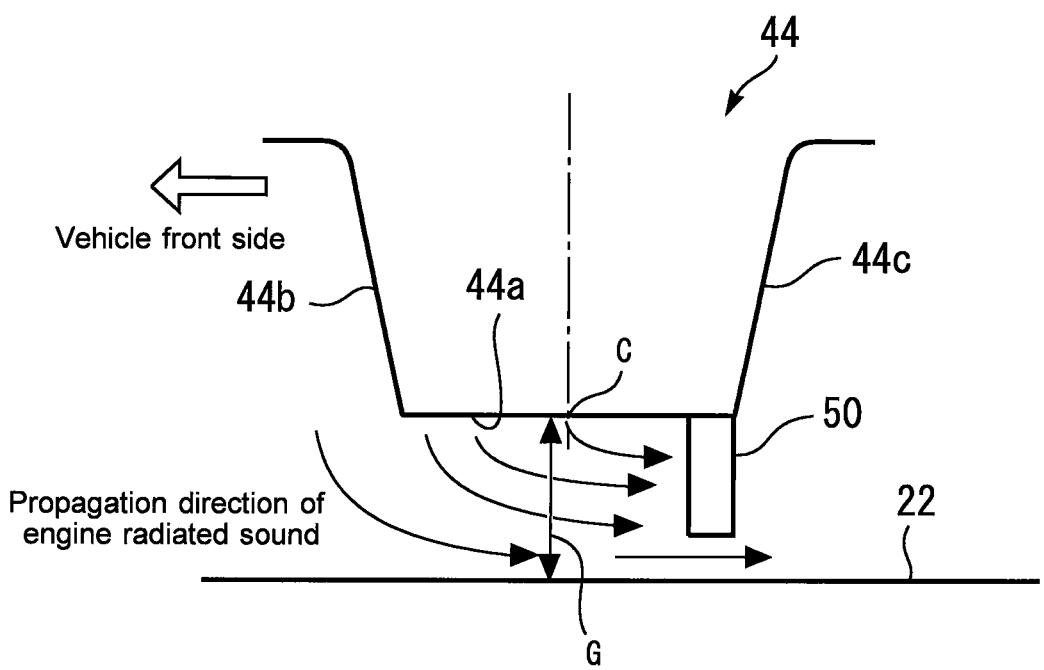
FIG. 3 is a diagram that schematically illustrates a main part of the vehicle lower structure shown in FIG. 1.

FIG. 3 is a diagram that schematically illustrates a main part of the vehicle lower structure shown in FIG. 1. In view of the issue described above, the vehicle lower structure according to the present embodiment is provided with a baffle plate (wall-like member) 50. The baffle plate 50 is arranged between the oil pan 44 and the lower cover 22.

Specifically, in the example shown in FIG. 3, it is supposed that the baffle plate 50 is separated from the oil pan 44 and is attached to the oil pan 44 using a fastener which is not shown. Although the material of the baffle plate 50 is not particularly limited, the baffle plate 50 can be configured with the same material (for example, metal material such as iron or aluminum) as that of the oil pan 44. In addition, contrary to the example described above, the baffle plate 50 may alternatively be formed integrally with the oil pan 44.

With respect to the front-rear direction of the vehicle 10, the baffle plate 50 is arranged on a portion of a bottom surface 44a of the oil pan 44 located on the rear side of a center position C of the oil pan 44 in the front-rear direction of the vehicle 10. To be more specific, the baffle plate 50 is arranged at a rear end portion of the oil pan 44 (i.e., at a portion located at the rear end portion of the bottom surface 44a, a side surface 44c of the oil pan 44 on the vehicle rear side, and its vicinity) that is one example of the portion described above. Also, in the example shown in FIG. 3, the baffle plate 50 is arranged at the rear end portion of the bottom portion 44a that is one example of the rear end portion of the oil pan 44. In addition, the baffle plate 50 protrudes toward the lower cover 22 from a part of the bottom surface 44a in the front-rear direction of the vehicle 10. It should be noted that the thickness of the baffle plate 50 (i.e., the width in the front-rear direction of the vehicle 10) is determined to have a rigidity required to properly hold the shape of the baffle plate 50.

With respect to the top-bottom direction of the vehicle 10, the baffle plate 50 is formed so as to protrude toward the lower cover 22 from the side of the oil pan 44. TA gap is formed between the top end of the baffle plate 50 and the lower cover 22 to create a dynamic gap between the internal combustion engine 14 and the lower cover 22. The dynamic gap mentioned here corresponds to a gap required to prevent the internal combustion engine 14 from coming into contact with the lower cover 22 when the internal combustion engine 14 moves with respect to the vehicle 10.

On that basis, in order to effectively reduce (insulate) the engine radiated sound passing through the gap G between the oil pan 44 and the lower cover 22, it is favorable that the baffle plate 50 protrudes toward the lower cover 22 as greatly as possible. Accordingly, the height of the baffle plate 50 (i.e., the amount of protrusion toward the lower cover 22) is determined such that the gap between the baffle plate 50 and the lower cover 22 becomes equal to a minimum value that can create the dynamic gap described above.

Furthermore, with respect to the left-right direction of the vehicle 10, the baffle plate 50 is formed so as to extend in the left-right direction of the vehicle 10. The engine radiated sound is diffracted toward the outer side of each end portion of the baffle plate 50 in the left-right direction of the vehicle 10. Because of this, it is favorable that the baffle plate 50 is formed so as to extend in the left-right direction of the vehicle 10 as long as possible. Accordingly, in the present embodiment, with respect to the left-right direction of the vehicle 10, the baffle plate 50 is formed so as to extend over the whole width of the oil pan 44 as an example. However, the width of the baffle plate 50 in the left-right direction of the vehicle 10 may alternatively be longer than the width of the oil pan 44, or be shorter than that.

It should be noted that "forming the baffle plate so as to extend in the left-right direction of the vehicle" mentioned here does not require the baffle plate strictly extending straight in the left-right direction of the vehicle, and the baffle plate thus may alternatively be formed so as to extend in, for example, a direction inclined with respect to the left-right direction of the vehicle. Also, although it is supposed that the height of the baffle plate 50 (i.e., the amount of protrusion described above) is constant as an example, this may not always be constant. Furthermore, in the example shown in FIG. 3, although the number of the baffle plate 50 arranged at the oil pan 44 is one, it may alternatively be plural.

1-2. Advantageous Effects

As described so far, the vehicle lower structure according to the present embodiment is provided with the baffle plate 50 arranged between the oil pan 44 and the lower cover 22, so as to insulate the gap G therebetween. FIG. 3 represents a behavior of the engine radiated sound from the bottom surface 44a of the oil pan 44 and the vicinity thereof (i.e., a side surface 44b of the oil pan 44 located on the vehicle front side of the bottom portion 44a, and a portion of the internal combustion engine 14 located on the upper side of the side portion 44b (for example, crankcase 40)) propagating toward the vehicle rear side in the gap G. With the baffle plate 50 being installed, as shown in FIG. 3, the engine radiated sound passing through the gap G and propagating to the vehicle rear side can be favorably reduced. As a result, the engine radiated sound can be prevented from being released outside the vehicle 10 (more specifically, to the rear side of the vehicle 10) from the engine compartment 12.

Moreover, in the example shown in FIG. 3, the baffle plate 50 is arranged at the portion of the bottom surface 44a located on the rear side of the center position C of the oil pan 44 in the front-rear direction of the vehicle 10. Contrary to this kind of example, the baffle plate 50 may alternatively be arranged at, for example, the front end portion of the bottom surface 44a in the front-rear direction of the vehicle 10. If, however, the baffle plate 50 is arranged at the front end portion of the bottom surface 44a, the propagation of the engine radiated sound from the bottom surface 44a toward the vehicle rear side cannot be reduced. In contrast to this, according to the example shown in FIG. 3, the propagation of the engine radiated sound from the bottom surface 44a can also be reduced. In particular, in the example shown in FIG. 3, the baffle plate 50 is arranged at the rear end portion of the bottom surface 44a in the front-rear direction of the vehicle 10. Because of this, the propagation of the engine radiated sound from the bottom surface 44a can be reduced more effectively.

Furthermore, with the baffle plate 50 being installed, only a part of the oil pan 44 (in the example shown in FIG. 3, the rear end portion of the bottom surface 44a) is covered by the baffle plate 50. Because of this, as compared to the example in which the whole oil pan 44 is covered by a baffle plate, release of heat from the oil pan 44 (i.e., cooling effect of the oil pan 44) is hardly blocked. Thus, according to the vehicle lower structure of the present embodiment, reduction of the propagation of the engine radiated sound and cooling performance of the oil pan 44 can be both achieved.

1-3. Modification Example

Figure 4:
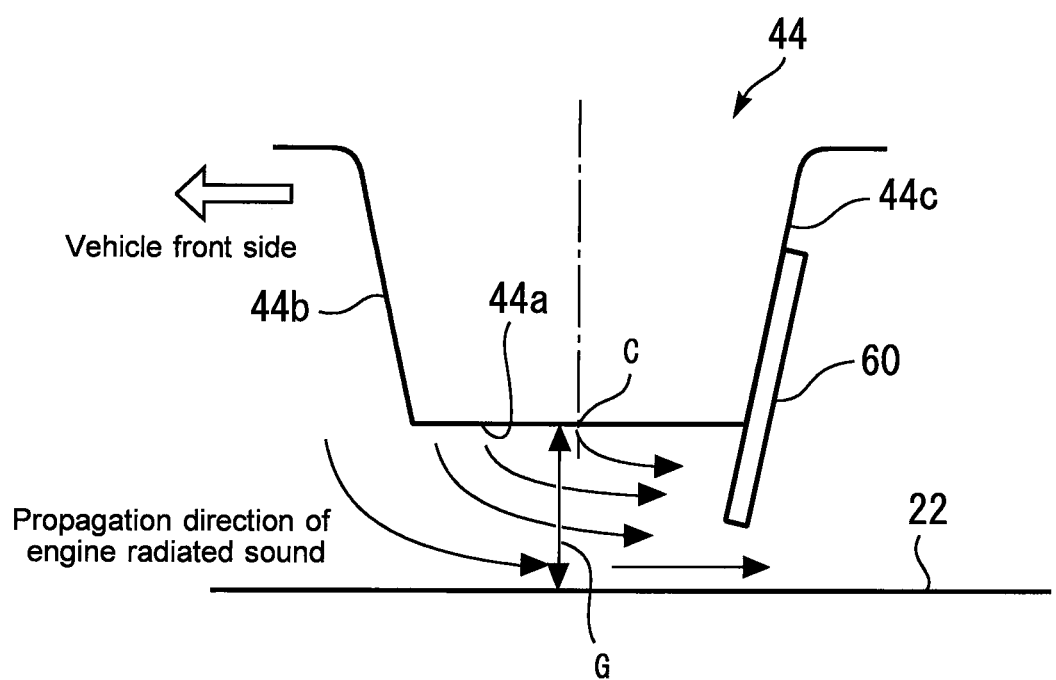
FIG. 4 is a schematic diagram for describing a modification example concerning the vehicle lower structure according to the first embodiment of the present disclosure.

FIG. 4 is a schematic diagram for describing a modification example concerning the vehicle lower structure according to the first embodiment of the present disclosure. According to the example shown in FIG. 3 described above, the baffle plate 50 is arranged at the rear end portion of the bottom surface 44a of the oil pan 44. In contrast to this, according to the modification example shown in FIG. 4, a baffle plate 60 is arranged at the side surface 44c of the oil pan 44 located on the vehicle rear side relative to the bottom surface 44a, and, similarly to the baffle plate 50, protrudes toward the lower cover 22 from the rear end portion of the bottom surface 44a. The installation of the baffle plate 60 in this kind of modification example can also achieve advantageous effects similar to those of the first embodiment.

2. Second Embodiment

Next, a second embodiment according to the present disclosure and a modification example thereof will be described with reference to FIGS. 5 and 6.

2-1. Example of Configuration of Main Part of Vehicle Lower Structure

Figure 5:
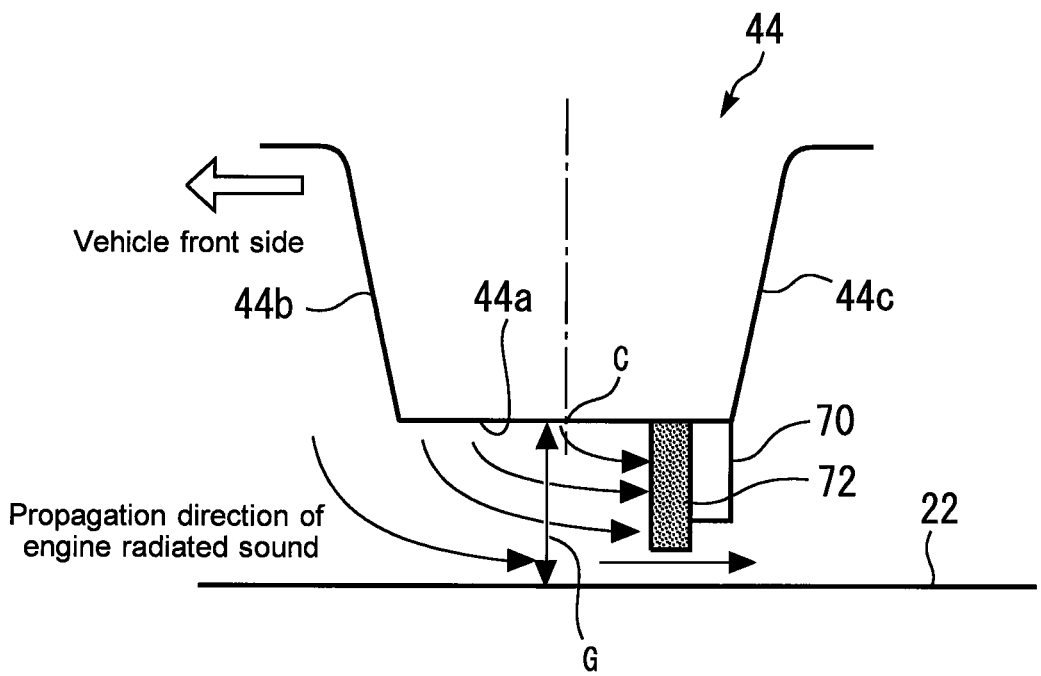
FIG. 5 is a diagram that schematically illustrates a main part of a vehicle lower structure according to a second embodiment of the present disclosure.

FIG. 5 is a diagram that schematically illustrates a main part of the vehicle lower structure according to the second embodiment of the present disclosure. The vehicle lower structure according to the second embodiment is different from the vehicle lower structure according to the first embodiment in terms of the configuration around the baffle plate described below.

Specifically, the vehicle lower structure according to the present embodiment is provided with a baffle plate 70 and an acoustic absorbent 72 as shown in FIG. 5. For example, a fibrous material made of PET (Polyethylene terephthalate) fiber or a foamed material such as urethane can be used as the material of the acoustic absorbent 72.

As shown in FIG. 5, the baffle plate 70 is arranged at the rear end portion of the bottom surface 44a of the oil pan 44, similarly to the baffle plate 50 shown in FIG. 3. Also, the acoustic absorbent 72 is arranged at a portion of the baffle plate 70 located on the vehicle front side. To be more specific, the acoustic absorbent 72 is attached to the baffle plate 70 using an adhesive, for example. It should be noted that the acoustic absorbent 72 may alternatively be arranged, for example, so as to extend over the whole surface of the baffle plate 70, instead of the example described above, as long as it is arranged at "a portion of the baffle plate 70 located on at least the vehicle front side".

With respect to the top-bottom direction of the vehicle 10, the acoustic absorbent 72 is formed so as to protrude toward the lower cover 22 from the side of the oil pan 44. In the example shown in FIG. 5, the height of the acoustic absorbent 72 (i.e., amount of protrusion) is determined to be a minimum value that can create a dynamic gap between the internal combustion engine 14 and the lower cover 22 at the tip position of the acoustic absorbent 72. Also, with respect to the left-right direction of the vehicle 10, the baffle plate 70 is formed so as to extend over the whole width of the oil pan 44 similarly to the baffle plate 50. Moreover, with respect to the left-right direction of the vehicle 10, the acoustic absorbent 72 is formed, as an example, so as to wholly extend over this baffle plate 70.

2-2. Advantageous Effects

As described so far, according to the vehicle lower structure of the present embodiment, the acoustic absorbent 72 is arranged at the portion of the baffle plate 70 (which is similar to the baffle plate 50 shown in FIG. 3) located on the vehicle front side. This can not only cause the baffle plate 70 to disturb the propagation of the engine radiated sound toward the vehicle rear side through the gap G but also attenuate, by the use of the acoustic absorbent 72, the energy of the engine radiated sound that has propagated toward the acoustic absorbent 72. Because of this, the propagation of the engine radiated sound toward the vehicle rear side through the gap G can be reduced more effectively. As a result, the release of the engine radiated sound to the outside of the vehicle 10 (more specifically, to the rear side of the vehicle 10) from the engine compartment 12 can be reduced more effectively. Other advantageous effects similar to those of the first embodiment can be achieved.

2-3. Modification Example

Figure 6:
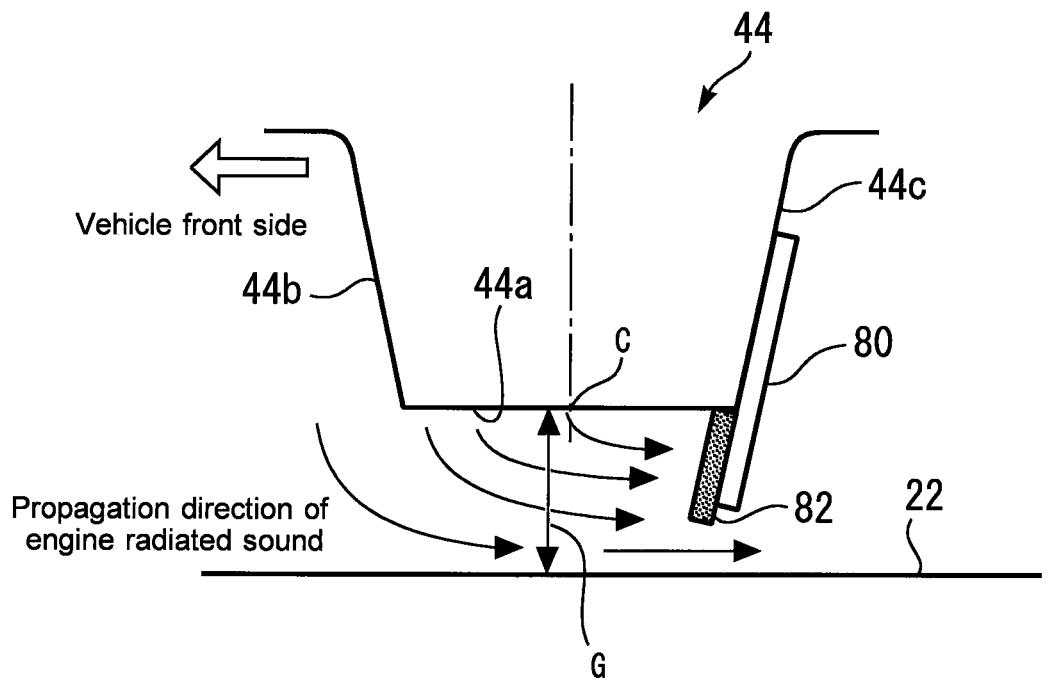
FIG. 6 is a schematic diagram for describing a modification example concerning the vehicle lower structure according to the second embodiment of the present disclosure.

FIG. 6 is a schematic diagram for describing a modification example concerning the vehicle lower structure according to the second embodiment of the present disclosure. Hereunder, a difference of this modification example with respect to the example shown in FIG. 5 will be described. According to the modification example shown in FIG. 6, a baffle plate 80 is arranged at the side surface 44c of the oil pan 44 located on the vehicle rear side, similarly to the baffle plate 60 (see FIG. 4). Also, an acoustic absorbent 82 having a configuration similar to that of the acoustic absorbent 72 is arranged at a portion of this baffle plate 80 located on the vehicle front side. As just described, the acoustic absorbent 82 may alternatively be arranged at a portion that is included in the baffle plate 80 installed on the side surface 44c of the oil pan 44 and that faces the gap G. with the baffle plate 80 and the acoustic absorbent 82 in this kind of modification example being installed, an advantageous effect similar to that of the second embodiment can also be achieved.

3. Third Embodiment

Next, a third embodiment according to the present disclosure and a modification example thereof will be described with reference to FIGS. 7 and 8.

3-1. Example of Configuration of Main Part of Vehicle Lower Structure

Figure 7:
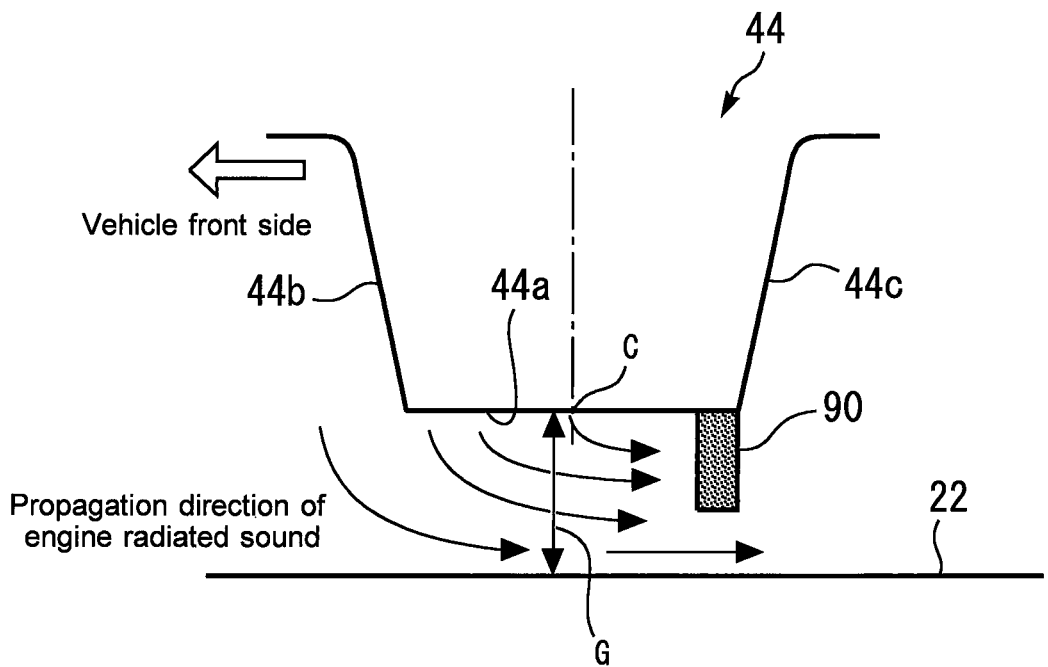
FIG. 7 is a diagram that schematically illustrates a main part of a vehicle lower structure according to a third embodiment of the present disclosure.

FIG. 7 is a diagram that schematically illustrates a main part of the vehicle lower structure according to the third embodiment of the present disclosure. The vehicle lower structure according to the third embodiment is different from the vehicle lower structure according to the first embodiment in terms of the configuration around the baffle plate described below.

Specifically, the vehicle lower structure according to the present embodiment is provided with a baffle plate 90 as shown in FIG. 7. The installation position and shape of the baffle plate 90 are the same as those of the baffle plate 50 shown in FIG. 3, as an example. On that basis, according to the present embodiment, the baffle plate 90 itself is configured by an acoustic absorbent similar to the acoustic absorbent 72 shown in FIG. 5. In addition, including selection of the material of the baffle plate 90, the baffle plate 90 is configured to have a rigidity required to properly hold its shape during running of the vehicle 10.

3-2. Advantageous Effects

As described so far, the vehicle lower structure according to the present embodiment is provided with the baffle plate 90 configured by the acoustic absorbent. According to this kind of example, simplification of the structure can be achieved as compared to the second embodiment. Also, similarly to the second embodiment, the propagation of the engine radiated sound toward the vehicle rear side through the gap G is disturbed by the baffle plate 70, and the energy of the engine radiated sound that has propagated toward the baffle plate 90 (acoustic absorbent) can be attenuated by the baffle plate 90 that serves as the acoustic absorbent. Other advantageous effects similar to those of the first embodiment can be achieved.

3-3. Modification Example

Figure 8:
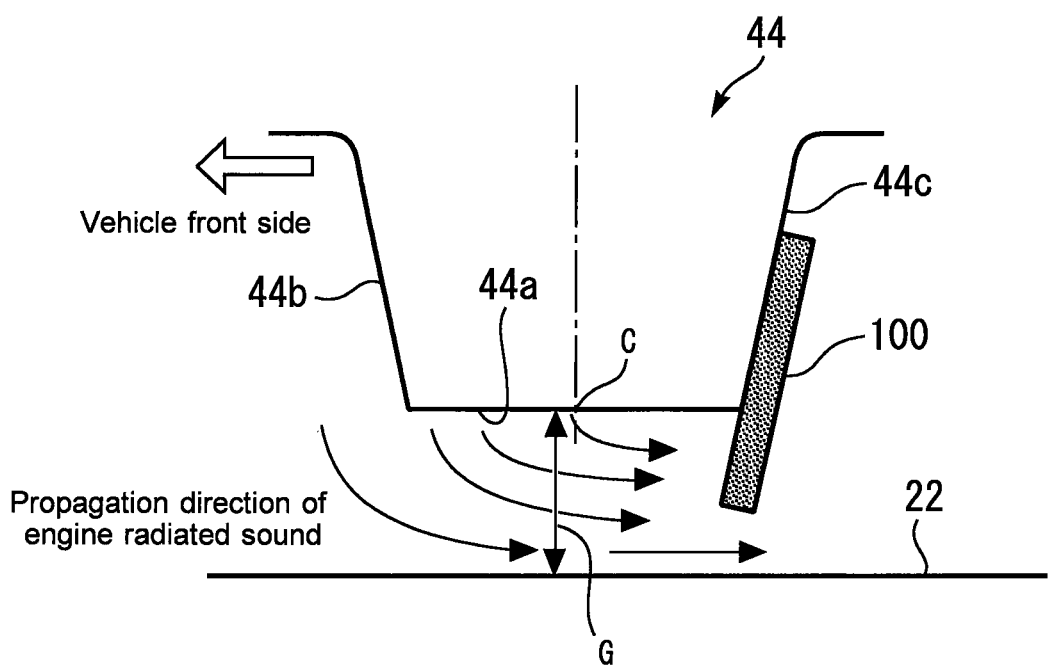
FIG. 8 is a diagram for describing a modification example concerning the vehicle lower structure according to the third embodiment of the present disclosure.

FIG. 8 is a diagram for describing a modification example concerning the vehicle lower structure according to the third embodiment of the present disclosure. The relationship between this modification example and the third embodiment is the same as the relationship between the modification example shown in FIG. 4 and the first embodiment. As shown in FIG. 8, a baffle plate 100 which is itself configured by an acoustic absorbent may also be arranged similarly to the baffle plate 60 (see FIG. 4) at the side surface 44c of the oil pan 44 located on the vehicle rear side. The arrangement of the baffle plate 100 in this kind of modification example can also achieve advantageous effects similar to those of the third embodiment.

4. Fourth Embodiment

Next, a fourth embodiment according to the present disclosure and modification examples thereof will be described with reference to FIGS. 9 and 10.

4-1. Example of Configuration of Main Part of Vehicle Lower Structure

Figure 9:
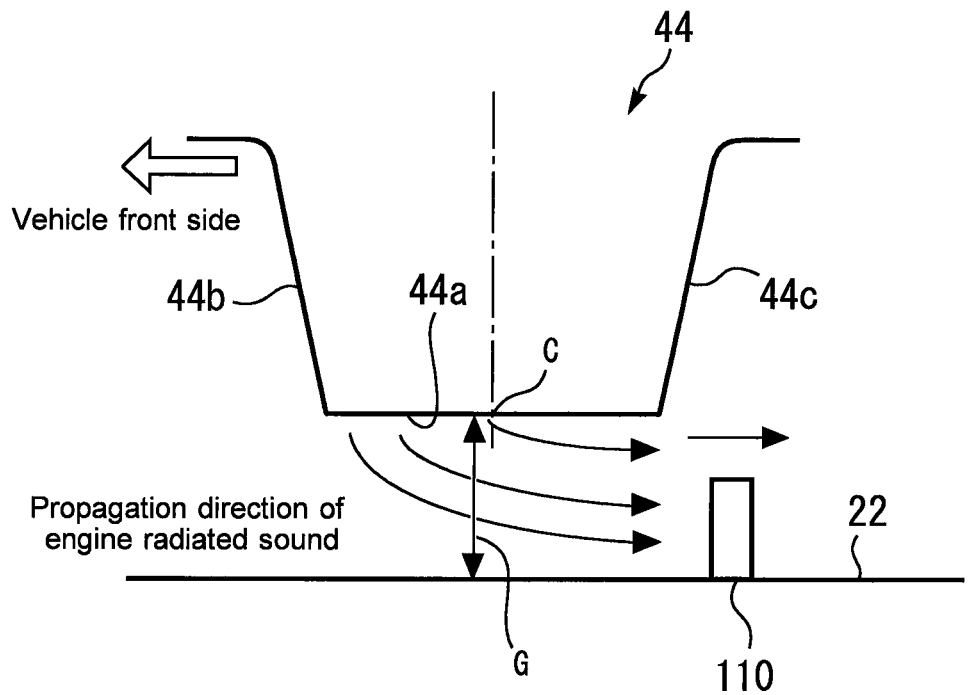
FIG. 9 is a diagram that schematically illustrates a main part of a vehicle lower structure according to a fourth embodiment of the present disclosure.

FIG. 9 is a diagram that schematically illustrates a main part of a vehicle lower structure according to the fourth embodiment of the present disclosure. The vehicle lower structure according to the fourth embodiment is different from the vehicle lower structure according to the first embodiment in terms of the configuration around the baffle plate described below.

Specifically, according to the vehicle lower structure of the present embodiment, as shown in FIG. 9, a baffle plate 110 is installed not on the side of the internal combustion engine 14 (i.e., side of the oil pan 44) but on the side of the lower cover 22. It is supposed that, in the example shown in FIG. 9, the baffle plate 110 is separated from the lower cover 22 and is attached to the lower cover 22 using a fastener which is not shown. Although the material of the baffle plate 110 is not particularly limited, the baffle plate 110 can be configured with the same material (for example, resin material) as that of the lower cover 22. In addition, contrary to the example described above, the baffle plate 110 may be formed integrally with the lower cover 22.

With respect to the front-rear direction of the vehicle, similarly to the example shown in FIG. 3, the baffle plate 110 is arranged on a portion of the lower cover 22 located on the rear side of the center position C of the oil pan 44 in the front-rear direction of the vehicle 10. In more detail, as an example, the baffle plate 110 is arranged on the lower cover 22 at a location opposed to the rear end portion of the oil pan 44 in the front-rear direction of the vehicle 10 (i.e., portion located on the rear end portion of the bottom portion 44a, the side surface 44c of the oil pan 44 on the rear side of the vehicle 10, and the vicinity thereof).

With respect to the top-bottom direction of the vehicle 10, the baffle plate 110 is formed so as to protrude toward the oil pan 44 from the side of the lower cover 22. To be more specific, the baffle plate 110 protrudes from the lower cover 22 toward the above-described rear end portion of the oil pan 44. According to the example shown in FIG. 9, the height (i.e., protrusion amount) of the baffle plate 110 is determined so as to be a minimum value that can create a dynamic gap between the internal combustion engine 14 and the lower cover 22 at the tip position of the baffle plate 110. In addition, the baffle plate 110 protrudes toward the internal combustion engine 14 (oil pan 44) from a part of the lower cover 22 in the front-rear direction of the vehicle 10.

Furthermore, with respect to the left-right direction of the vehicle 10, the baffle plate 110 is formed so as to extend in the left-right direction. To be more specific, with respect to the left-right direction, the baffle plate 110 is formed, as an example, so as to extend over the whole width of the oil pan 44 opposed to the lower cover 22. However, the width of the baffle plate 110 in the left-right direction of the vehicle 10 may be made longer than the width of the oil pan 44, or may be made shorter than that. It should be noted that, in the example shown in FIG. 9, although the number of the baffle plate 110 arranged on the lower cover 22 is one, it may be plural.

4-2. Advantageous Effects

As described so far, according to the vehicle lower structure of the present embodiment, the baffle plate 110 is arranged on the side of the lower cover 22. This kind of configuration can also favorably reduce the engine radiated sound passing through the gap G and propagating toward the vehicle rear side, similarly to the first embodiment. Other advantageous effects similar to those of the first embodiment can be achieved.

4-3. Modification Examples

Figure 10:
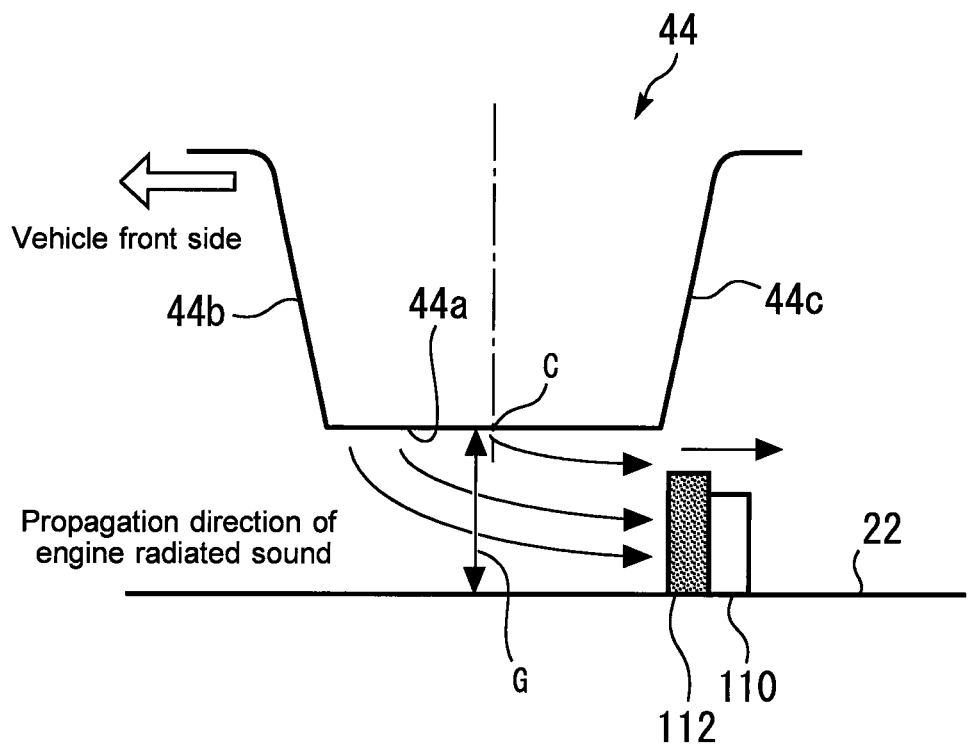
FIG. 10 is a schematic diagram for describing a modification example concerning the vehicle lower structure according to the fourth embodiment of the present disclosure.

FIG. 10 is a schematic diagram for describing a modification example concerning the vehicle lower structure according to the fourth embodiment of the present disclosure. As shown in this modification example, an acoustic absorbent 112 having a configuration similar to that of the acoustic absorbent 72 (see FIG. 7) may alternatively be arranged at a portion of the baffle plate 110 shown in FIG. 9 located on at least the vehicle front side. As a result, advantageous effects similar to those of the second embodiment can be achieved.

Furthermore, in another example of the baffle plate arranged on the side of the lower cover 22, a baffle plate may be configured by an acoustic absorbent similarly to the third embodiment.

5. Fifth Embodiment

Next, a fifth embodiment according to the present disclosure will be described with reference to FIG. 11.

5-1. Example of Configuration of Main Part of Vehicle Lower Structure

Figure 11:
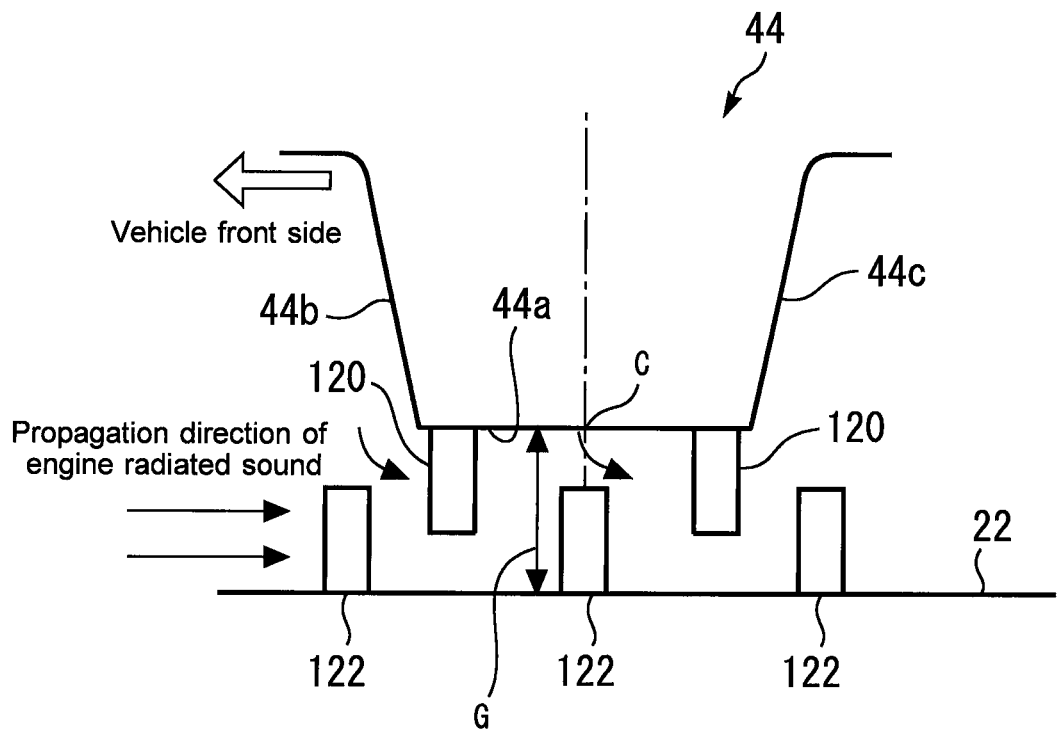
FIG. 11 is a diagram that schematically illustrates a main part of a vehicle lower structure according to a fifth embodiment of the present disclosure.

FIG. 11 is a diagram that schematically illustrates a main part of a vehicle lower structure according to the fifth embodiment of the present disclosure. The vehicle lower structure according to the fifth embodiment is different from the vehicle lower structure according to the first embodiment in terms of the configuration around the baffle plate described below.

Specifically, the vehicle lower structure according to the present embodiment is equipped with a plurality of baffle plates 120 and 122 as shown in FIG. 11. According to the example shown in FIG. 11, two baffle plates 120 are arranged at the side of the oil pan 44, and three baffle plates 122 are arranged at the side of the lower cover 22. The two baffle plates 120 protrude toward the lower cover 22 from the bottom surface 44a of the oil pan 44. On the other hand, the three baffle plates 122 protrude toward the oil pan 44 (i.e., internal combustion engine 14) from the lower cover 22. It should be noted that an example of the shapes of the baffle plates 120 and 122 in the left-right direction of the vehicle 10 is the same as that of the baffle plate 50 according to the first embodiment.

Moreover, these baffle plates 120 and 122 are arranged so as to separate from each other in the front-rear direction of the vehicle 10 as shown in FIG. 11. Also, in the view of them from the vehicle front side (i.e., in the vehicle front view), each of the two baffle plates 120 and each of the three baffle plates 122 are overlapped with each other in the top-bottom direction of the vehicle 10 as shown in FIG. 11. In addition, the baffle plates 120 and the baffle plates 122 are alternately arranged in the front-rear direction of the vehicle 10.

5-2. Advantageous Effects

As described so far, according to the vehicle lower structure of the present embodiment, the plurality of baffle plates 120 and 122 are arranged so as to separate from each other in the front-rear direction of the vehicle 10. Firstly, this can achieve the following advantageous effects. That is to say, without respect to whether or not the baffle plates 120 on the side of the oil pan 44 and the baffle plates 122 on the side of the lower cover 22 are overlapped with each other in the top-bottom direction similarly to the example shown in FIG. 11 in the view of them from the vehicle front direction, a part of the wave of the engine radiated sound is diffracted between the baffle plates 120 that are adjacent to each other or between the baffle plates 122 that are adjacent to each other. This can reduce the engine radiated sound passing through the gap G and propagating toward the vehicle rear side.

On that basis, according to the vehicle lower structure of the present embodiment, each of the two baffle plates 120 and each of the three baffle plates 122 are overlapped with each other in the top-bottom direction of the vehicle 10 in the view of them from the vehicle front side. As a result, the gap G can be eliminated in the vehicle side view. Because of this, the propagation of the engine radiated sound toward the vehicle rear side through the gap G can be reduced more effectively as compared to other first to fourth embodiments.

Furthermore, according to the vehicle lower structure of the present embodiment, the baffle plates 120 and the baffle plates 122 are alternately arranged in the front-rear direction of the vehicle 10. As a result, a propagation path of the engine radiated sound located between the oil pan 44 (i.e., internal combustion engine 14) and the lower cover 22 can be formed in a labyrinth structure. Therefore, when the engine radiated sound passes through the gap G, the engine radiated sound can be effectively attenuated.

5-3. Modification Examples

The vehicle lower structure according to the fifth embodiment described above can be modified as follows, for example. That is to say, similarly to the relationship between the first embodiment and the second embodiment, an acoustic absorbent similar to the acoustic absorbent 72 (see FIG. 5) may alternatively be arranged at a portion that is included in at least one of the baffle plates 120 and 122 according to the fifth embodiment and that is located on the vehicle front side. In addition, at least one of the baffle plates 120 and 122 according to the fifth embodiment may alternatively be configured by an acoustic absorbent.

It should be noted that, in the fifth embodiment and its modification examples described above, each of the baffle plates 120 corresponds to an example of the "first baffle plate" according to the present disclosure, and each of the baffle plates 122 corresponds to an example of the "second baffle plate" according to the present disclosure.

6. Sixth Embodiment

Next, a sixth embodiment according to the present disclosure will be described with reference to FIG. 12.

6-1. Example of Configuration of Main Part of Vehicle Lower Structure

Figure 12:
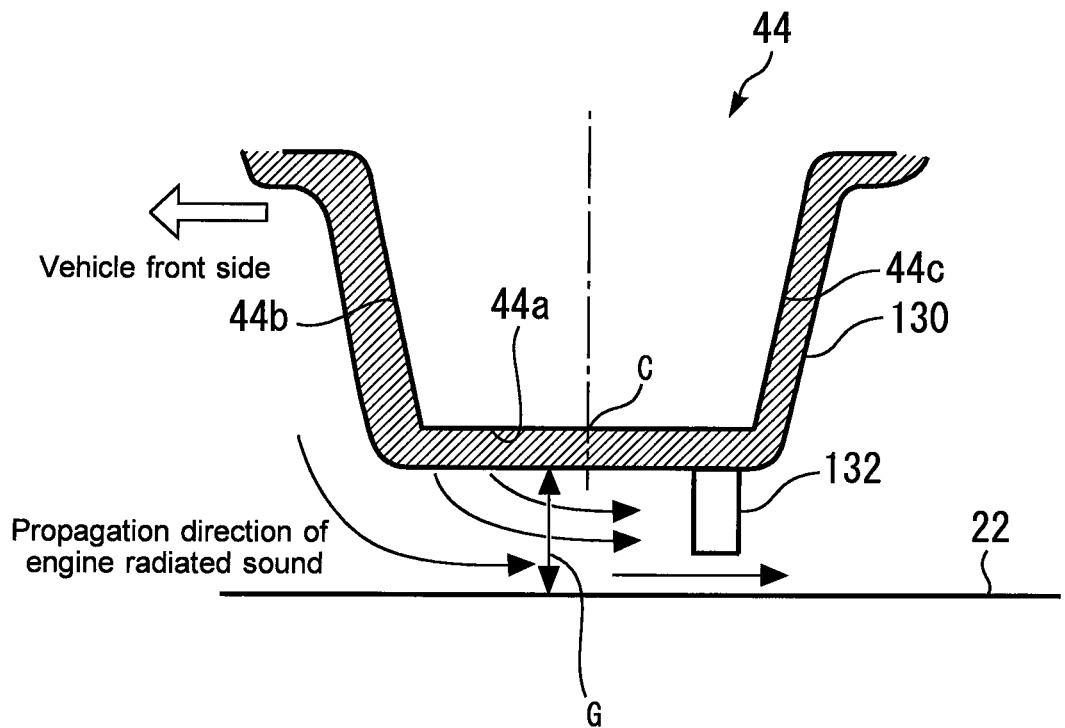
FIG. 12 is a diagram that schematically illustrates a main part of a vehicle lower structure according to a sixth embodiment of the present disclosure.

FIG. 12 is a diagram that schematically illustrates a main part of a vehicle lower structure according to the sixth embodiment of the present disclosure. The vehicle lower structure according to the sixth embodiment is different from the vehicle lower structure according to the first embodiment in terms of the following points.

Specifically, in a vehicle to which the vehicle lower structure according to the present embodiment is applied, the periphery of the internal combustion engine 14 is covered by acoustic insulation covers in order to improve the acoustic insulation properties of the internal combustion engine 14. An acoustic insulation cover 130 shown in FIG. 12 corresponds to a part of this kind of acoustic insulation covers. The acoustic insulation cover 130 covers the lower portion of the internal combustion engine 14 including the periphery of the oil pan 44.

In covering the internal combustion engine 14 by the acoustic insulation covers including the acoustic insulation cover 130, it can be said that, from a viewpoint of reduction of heat damage of the internal combustion engine 14, it is difficult to wholly cover the internal combustion engine 14 by the acoustic insulation covers without a gap. Because of this, there is a possibility that the engine radiated sound may be released from a gap between the individual acoustic insulation covers. In addition, it can be said that it is difficult for the acoustic insulation covers to completely prevent the engine radiated sound from being released outside. Namely, there is a possibility that the engine radiated sound may be released in such a way as to transmit through the acoustic insulation covers.

Therefore, the vehicle lower structure according to the present embodiment is provided with a baffle plate 132 for a vehicle that includes the acoustic insulation covers described above. The baffle plate 132 is arranged in order to reduce the propagation of the engine radiated sound toward the vehicle rear side through the gap G between the oil pan 44 (i.e., acoustic insulation cover 130) and the lower cover 22, similarly to other first to fifth embodiments.

To be more specific, according to the example shown in FIG. 12, the baffle plate 132 is arranged on the acoustic insulation cover 130 at a rear end portion of the oil pan 44 (i.e., of the bottom surface 44a) in the front-rear direction of the vehicle 10. This kind of example in which the baffle plate 132 is arranged on the acoustic insulation cover 130 also corresponds to one of examples according to the present disclosure concerning the configuration in which the baffle plate is arranged at the side of the internal combustion engine so as to protrude toward the lower cover.

The baffle plate 132 may alternatively be formed integrally with the acoustic insulation cover 130 or may be configured separately therefrom. In an example in which a member that forms an outer wall of the acoustic insulation cover 130 is configured by an acoustic absorbent, the baffle plate 132 may be formed integrally with the same material as that of the outer wall. As a result, this example corresponds to one of examples in which the baffle plate 132 is configured by an acoustic absorbent. It should be noted that the shape of the baffle plate 132 with respect to the left-right direction of the vehicle 10 is the same as that of the baffle plate 50 (see FIG. 3), as an example.

6-2. Advantageous Effects

According to the vehicle lower structure of the present embodiment described above, in the vehicle 10 provided with the internal combustion engine 14 around which is covered by the acoustic insulation covers in order to improve the acoustic insulation properties of the internal combustion engine 14, the propagation of the engine radiated sound toward the vehicle rear side through the gap G can be reduced by the use or the baffle plate 132.

Furthermore, any one of the vehicle lower structures according to other second to fifth embodiments may be combined with respect to a vehicle including the acoustic insulation cover as described above, instead of the vehicle lower structure according to the first embodiment.

7. Other Embodiments 7-1. Other Examples of Installation Locations of Baffle Plate in Front-Rear Direction of Vehicle According to the first to sixth embodiments described above, in order to reduce the propagation of the engine radiated sound toward the vehicle rear side through the gas G between the oil pan 44 and the lower cover 22, the baffle plates (such as, the baffle plate 50) are arranged at the oil pan 44, or at the portion of the lower cover 22 located in the vicinity of the oil pan 44.

However, the installation locations of the baffle plate in the front-rear direction of the vehicle according to the present disclosure are not limited to the examples described above, as long as the propagation of the engine radiated sound toward the vehicle rear side through a gap between an internal combustion engine and a lower cover can be reduced. In detail, with respect to the front-rear direction of the vehicle, the baffle plate may alternatively be arranged at a portion X of the internal combustion engine other than the oil pan, or at a portion Y of the lower cover opposed to the portion X, provided that the baffle plate is located within a range of the width of the internal combustion engine in the engine compartment.

Accordingly, portions at which the baffle plate may be arranged in the front-rear direction of the vehicle may be, for example, a portion A (for example, crankcase 40) other than the oil pan 44 as long as it is located within a range of the width of the engine main body 34 (see FIG. 1) in the front-rear direction of the vehicle 10 or a portion of the lower cover 22 opposed to the portion A. Also, the baffle plate may alternatively be arranged at a portion B other than the engine main body 34 (for example, intake-system parts 30 or exhaust-system parts 32) in the front-rear direction of the vehicle 10, or a portion of the lower cover 22 opposed to the portion B. It should be noted that, the exhaust-system parts 32 include an exhaust pipe connected with a portion of the exhaust-system parts 32 illustrated in FIG. 1, although illustration of the exhaust pipe is omitted in FIG. 1. This exhaust pipe extends to the vehicle rear side through the gap G between the lower cover 22 and the bulkhead 26. The portions at which the baffle plate may be arranged in the front-rear direction of the vehicle include a part of the exhaust pipe described above, as long as there is a portion of the lower cover 22 opposed to the exhaust pipe described above.

7-2. Another Example of Vehicle to which Vehicle Lower Structure is Applied

According to the first to sixth embodiments described above, the vehicle lower structure according to the present disclosure is applied to the vehicle 10 provided with the internal combustion engine 14 which is mounted such that the axial direction of the crankshaft 28 coincides with the left-right direction of the vehicle 10. However, another example of the vehicle to which the vehicle lower structure according to the present disclosure is applied may be a vehicle provided with an internal combustion engine such that the axial direction of its crankshaft coincided with the front-rear direction of the vehicle.

The embodiments and modification examples described above may be combined in other ways than those explicitly described above as required and may be modified in various ways without departing from the scope of the present disclosure.

What is claimed is:

1. A vehicle lower structure, comprising:
    an internal combustion engine arranged in an engine compartment of a vehicle;
    a lower cover arranged below the internal combustion engine and formed so as to cover a lower portion of the engine compartment;
    one or more baffle plates arranged between the internal combustion engine and the lower cover; and an acoustic absorbent that is arranged at only a portion of at least one of the one or more baffle plates, the portion facing a vehicle front side, wherein the one or more baffle plates:
are arranged inside the engine compartment;
and protrude toward the lower cover from a side of the internal combustion engine or protrude toward the internal combustion engine from a side of the lower cover, along a top-bottom direction of the vehicle; and
extend along a left-right direction of the vehicle.

2. The vehicle lower structure according to claim 1, wherein the one or more baffle plates include a plurality of baffle plates, and
wherein the plurality of baffle plates are arranged so as to be separated from each other in the front-rear direction of the vehicle.

3. The vehicle lower structure according to claim 2, wherein a first baffle plate which is at least one of the plurality of baffle plates protrudes toward the lower cover from the side of the internal combustion engine along the top-bottom direction of the vehicle,
wherein a second baffle plate which is at least another one of the plurality of baffle plates protrudes toward the internal combustion engine from the side of the lower cover along the top-bottom direction of the vehicle, and
wherein, in a view of the plurality of baffle plates from a front side of the vehicle, the first baffle plate and the second baffle plate are overlapped with each other in the top-bottom direction of the vehicle.

4. The vehicle lower structure according to claim 3, wherein the first baffle plate and the second baffle plate are arranged alternately along the front-rear direction of the vehicle.

5. The vehicle lower structure according to claim 1, wherein the internal combustion engine includes an oil pan arranged at a bottom portion of the internal combustion engine, and
wherein at least one of the one or more baffle plates is arranged on the oil pan or arranged on the lower cover at a location opposed to the oil pan.

6. The vehicle lower structure according to claim 5, wherein at least one of the one or more baffle plates is arranged on the oil pan or the lower cover at a portion located on a rear side of a center position of the oil pan in the front-rear direction of the vehicle.

7. The vehicle lower structure according to claim 6, wherein at least one of the one or more baffle plates is arranged on the oil pan so as to protrude toward the lower cover from a rear end portion of the oil pan in the front-rear direction of the vehicle.

8. The vehicle lower structure according to claim 6, wherein at least one of the one or more baffle plates is arranged on the lower cover so as to protrude from the lower cover toward a rear end portion of the oil pan in the front-rear direction of the vehicle.

9. A vehicle lower structure, comprising:
an internal combustion engine arranged in an engine compartment of a vehicle;
a lower cover arranged below the internal combustion engine and formed so as to cover a lower portion of the engine compartment; and
a plurality of baffle plates arranged between the internal combustion engine and the lower cover,
wherein the plurality of baffle plates:
are arranged inside the engine compartment;
protrude toward the lower cover from a side of the internal combustion engine or protrude toward the internal combustion engine from a side of the lower cover, along a top-bottom direction of the vehicle;
extend along a left-right direction of the vehicle; and
are arranged so as to be separated from each other along the front-rear direction of the vehicle,
wherein a first baffle plate which is at least one of the plurality of baffle plates protrudes toward the lower cover from the side of the internal combustion engine along the top-bottom direction of the vehicle,
wherein a second baffle plate which is at least another one of the plurality of baffle plates protrudes toward the internal combustion engine from the side of the lower cover along the top-bottom direction of the vehicle, and
wherein, in a view of the plurality of baffle plates from a front side of the vehicle, the first baffle plate and the second baffle plate are overlapped with each other in the top-bottom direction of the vehicle.

10. The vehicle lower structure according to claim 9, wherein at least one of the plurality of baffle plates is configured by an acoustic absorbent.

\* \* \* \* \*